United States Patent
Zhou et al.

(10) Patent No.: US 12,179,832 B1
(45) Date of Patent: Dec. 31, 2024

(54) TELESCOPIC MULTIFUNCTIONAL STEERING COLUMN

(71) Applicant: Dongguan Excar Electric Vehicle Co., Ltd, Dongguan (CN)

(72) Inventors: Jianhui Zhou, Dongguan (CN); Runguang Zhou, Dongguan (CN); Bo Wu, Dongguan (CN)

(73) Assignee: Dongguan Excar Electric Vehicle Co., Ltd, Dongguan (CN)

( * ) Notice: Subject to any disclaimer, the term of this patent is extended or adjusted under 35 U.S.C. 154(b) by 0 days.

(21) Appl. No.: 18/812,607

(22) Filed: Aug. 22, 2024

(30) Foreign Application Priority Data

Jun. 26, 2024 (CN) .......................... 202410834459.5

(51) Int. Cl.
*B62D 1/185* (2006.01)
*B62D 1/184* (2006.01)

(52) U.S. Cl.
CPC ............. *B62D 1/185* (2013.01); *B62D 1/184* (2013.01)

(58) Field of Classification Search
CPC ................................ B62D 1/185; B62D 1/184
See application file for complete search history.

(56) References Cited

FOREIGN PATENT DOCUMENTS

| | | | | |
|---|---|---|---|---|
| CN | 201677916 U | | 12/2010 | |
| CN | 112061224 A | | 12/2020 | |
| CN | 113788062 A | * | 12/2021 | ........... B60R 21/201 |
| CN | 219077287 U | | 5/2023 | |
| DE | 4239999 A1 | * | 6/1994 | ............. B62D 1/184 |
| DE | 102017007960 A1 | * | 2/2018 | ........... B60R 21/207 |
| JP | 09142311 A | * | 6/1997 | ............. B62D 1/184 |
| KR | 20060104188 A | * | 10/2006 | |
| KR | 20080084008 A | * | 9/2008 | |
| KR | 20230173304 A | * | 12/2023 | |
| WO | WO-2015028803 A1 | * | 3/2015 | ............. B62D 1/184 |

\* cited by examiner

*Primary Examiner* — Drew J Brown

(57) ABSTRACT

The disclosure relates to the technical field of steering columns, and specifically discloses a telescopic multifunctional steering column. An upper column is fixedly mounted inside a steering wheel. An outer surface of the upper column is sleeved with a lower column. In the disclosure, slidable connection is realized through a spline groove and a spline shaft, so that the steering column can extend and retract, which ensures stability and sliding smoothness of the column during the extension and retraction process. By connecting a pull bolt with a locking switch of a lifting rod through a wire rope, when the pull bolt is pulled up, a driver can adjust a length of the column according to his own needs, which improves driving flexibility and comfort. When the pull bolt retracts, the steering column is locked at a selected position.

6 Claims, 4 Drawing Sheets

TELESCOPIC MULTIFUNCTIONAL STEERING COLUMN

CROSS-REFERENCE TO RELATED APPLICATIONS

The application claims priority to Chinese patent application No. 202410834459.5, filed on Jun. 26, 2024, the entire contents of which are incorporated herein by reference.

TECHNICAL FIELD

The disclosure relates to the technical field of steering columns, and in particular to a telescopic multifunctional steering column.

BACKGROUND

A steering column of a golf cart is an important part of the steering system of the golf cart, which is directly associated with controllability and safety of the vehicle. The steering column, which is an important component that connects the steering wheel and the steering mechanism, allows the driver to control the vehicle to turn by means of the steering wheel. In the golf cart, the design of the steering column needs to take into account the control stability, driving comfort and safety of the vehicle.

However, the existing steering columns on golf carts are generally not telescopic. Due to the different heights of drivers and the changing terrain and environment of the golf course, it is necessary to use a telescopic steering column when driving the golf cart, which can increase the increase the flexibility of use and improve the driving comfort and safety. Moreover, the existing steering columns of the golf carts only have a single function and do not have a light control module and an ignition module, which is not user-friendly enough.

In view of this, the disclosure provides a telescopic multifunctional steering column.

SUMMARY

An objective of the disclosure is to provide a telescopic multifunctional steering column in order to solve the problem that the steering columns of the golf carts are not telescopic and do not have a light control module and an ignition module in the BACKGROUND.

The objective of the disclosure may be realized by the following technical solutions:

A telescopic multifunctional steering column includes a steering wheel. An upper column is fixedly mounted inside the steering wheel. An outer surface of the upper column is sleeved with a lower column. An outer surface of the lower column is provided with a lifting rod. The outer surface of the upper column is provided with a housing assembly. A switch of the lifting rod is connected with a pull bolt through a wire rope, and the wire rope is arranged at an end portion of the pull bolt.

As a further solution of the disclosure, the housing assembly includes a left housing and a right housing, and the pull bolt is inserted inside the left housing. An outer surface of the left housing is provided with a light control module, and an outer surface of the right housing is provided with an ignition module.

As a further solution of the disclosure, the upper column and the lower column are connected through a spline shaft and a spline groove.

As a further solution of the disclosure, the outer surface of the lower column is sleeved with a fixing bracket.

As a further solution of the disclosure, the left housing and the right housing are connected and fixed through a plurality of sets of screws.

As a further solution of the disclosure, one end of the lifting rod is connected to the lower column through a first nut, and the other end of the lifting rod is connected to the upper column through bolts and second nuts.

The disclosure has the following beneficial effects:

(1) In the disclosure, the steering column includes the upper column and the lower column which are connected slidably through the spline groove and the spline shaft, so that the steering column can extend and retract. This connection ensures the stability and sliding smoothness of the column during the extension and retraction process.

(2) In the disclosure, by arranging the rotatable pull bolt on the housing, when the pull bolt is pulled up and rotated by a certain angle, it will remain in the pulled and fixed position. At this time, the upper column and the lower column become adjustable and telescopic. One the pull bolt is pulled to another angle, it will automatically reset and retract so as to lock the upper column and the lower column at a required length, so that the extension and retraction stroke can be controlled.

(3) In the disclosure, by connecting the pull bolt with the locking switch of the lifting rod through the wire rope, when the pull bolt is pulled up, it will pull the locking switch of the lifting rod through the wire rope, so that the lifting rod is in a telescopic state, and thereby, the driver can adjust the length of the column according to his own needs, which improves the driving flexibility and comfort. When the pull bolt retracts, the locking switch of the lifting rod will reset so as to lock the upper column and the lower column at the selected position, which can improve the safety during the driving process and reduce safety hazards caused by unexpected extension and retraction.

(4) In the disclosure, by arranging the housing assembly which is provided with a structure for mounting a light control module and a structure for the mounting position of an ignition module, the light control module and the ignition module can be mounted on the housing. Moreover, the housing assembly is mounted to the steering column through the screws, so that light control and ignition functions are integrated to the steering column.

BRIEF DESCRIPTION OF DRAWINGS

The disclosure will be further described below in conjunction with the accompanying drawings.

In the figures: 1, steering wheel; 2, upper column; 3, lower column; 301, fixing bracket; 4, lifting rod; 5, housing assembly; 501, left housing; 502, right housing; 6, light control module; 7, pull bolt; 701, wire rope; 8, screw; 9, ignition module.

DETAILED DESCRIPTION OF THE EMBODIMENTS

The technical solutions in the examples of the disclosure will be clearly and completely described below with reference to the accompanying drawings in the examples of the disclosure. It is apparent that the described examples are only a part, rather than all of the examples of the disclosure. All other examples obtained by those of ordinary skill in the art based on the examples of the disclosure without creative work shall fall within the protection scope of the disclosure.

Figure 1:
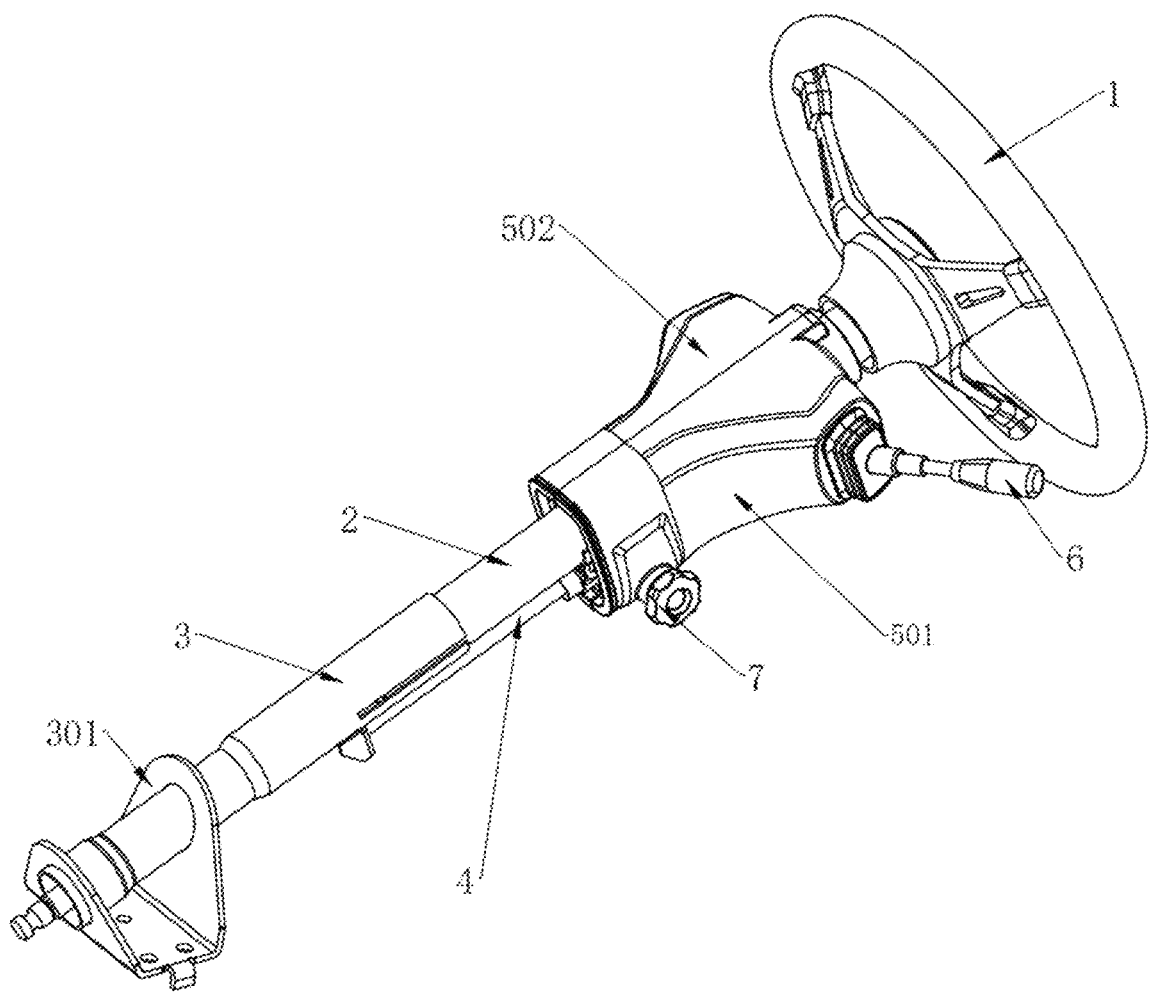
FIG. 1 is a schematic view of an overall structure of the disclosure.
Figure 2:
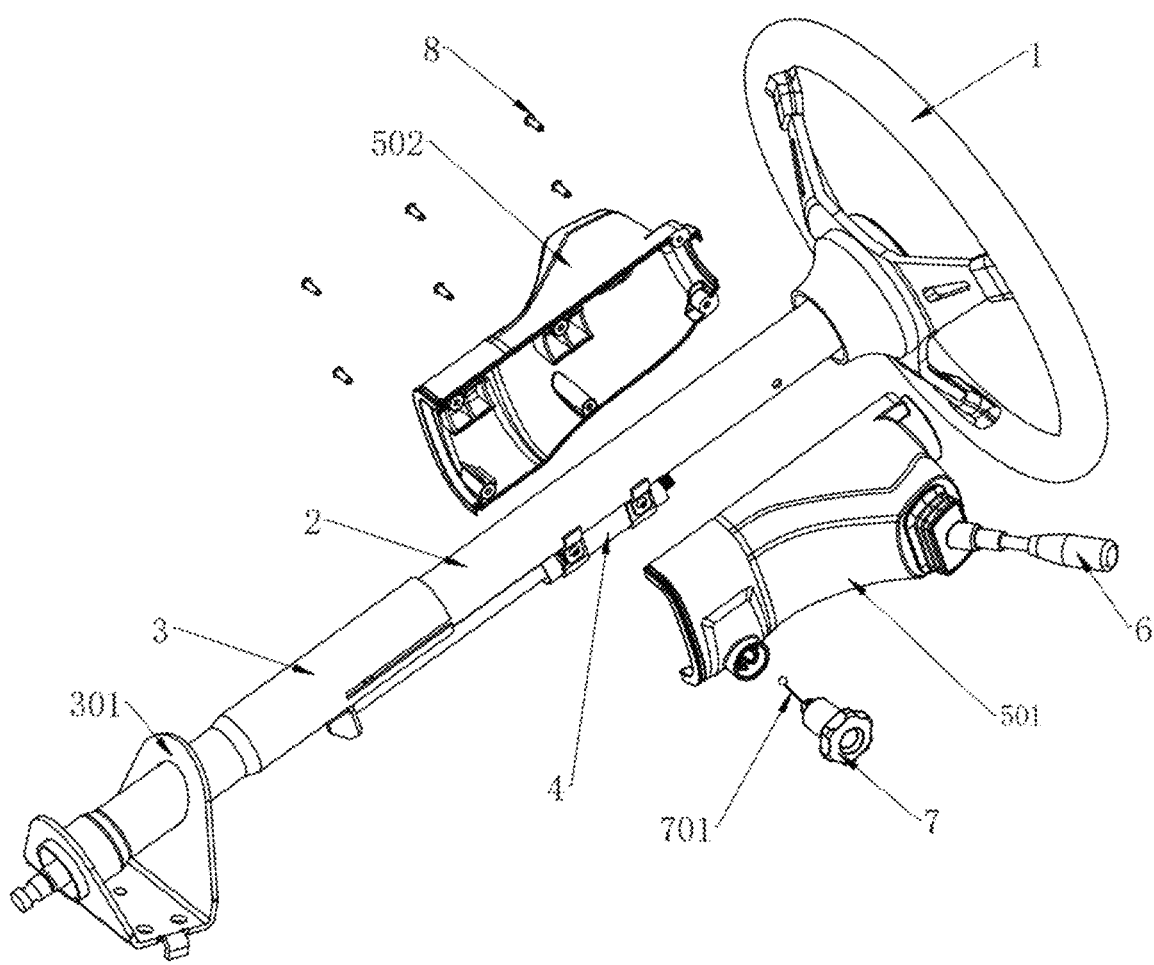
FIG. 2 is a schematic exploded view of a housing assembly in the overall structure of the disclosure.
Figure 3:
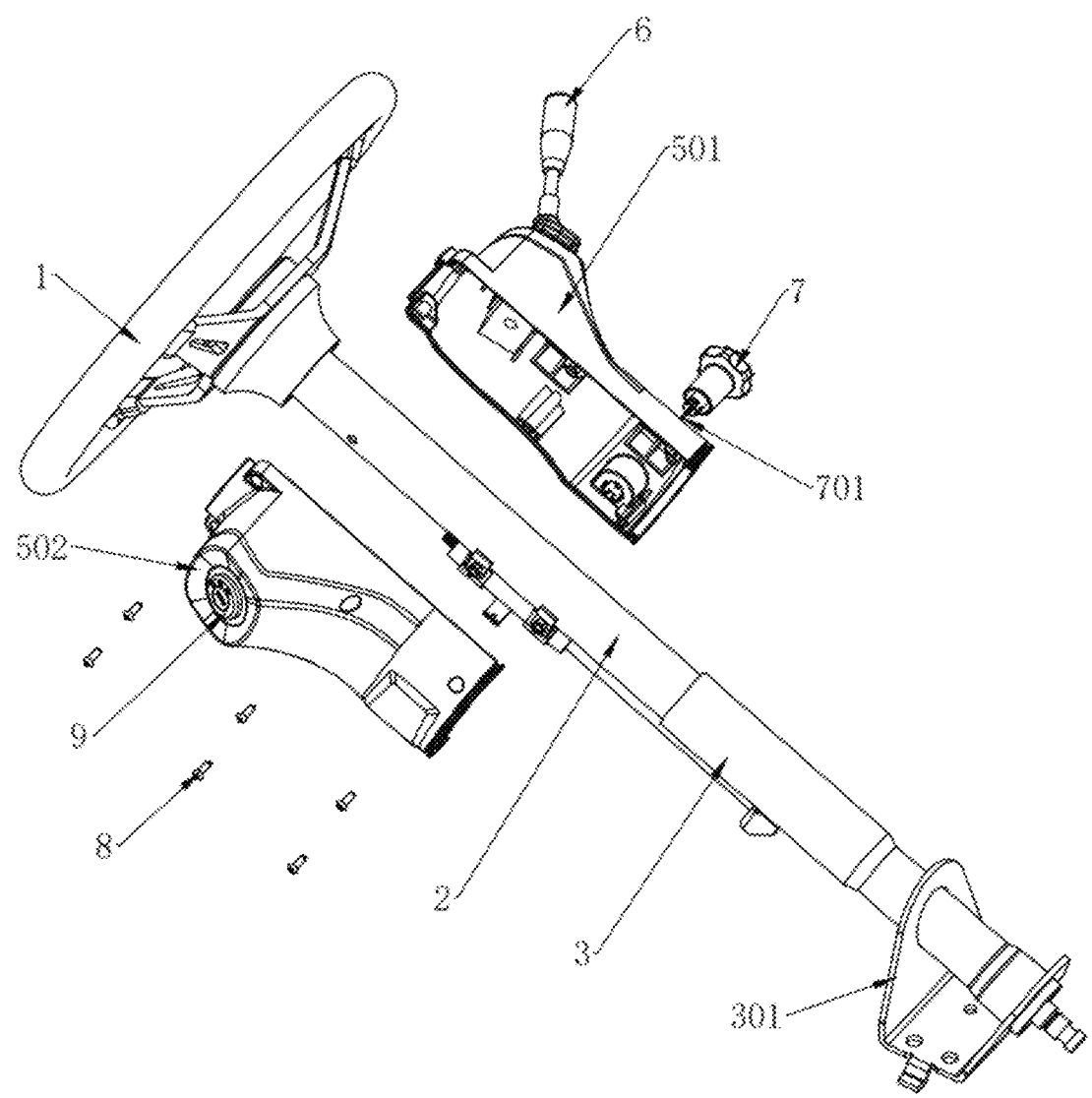
FIG. 3 is a schematic exploded view of the housing assembly in the overall structure of the disclosure from another viewing angle.
Figure 4:
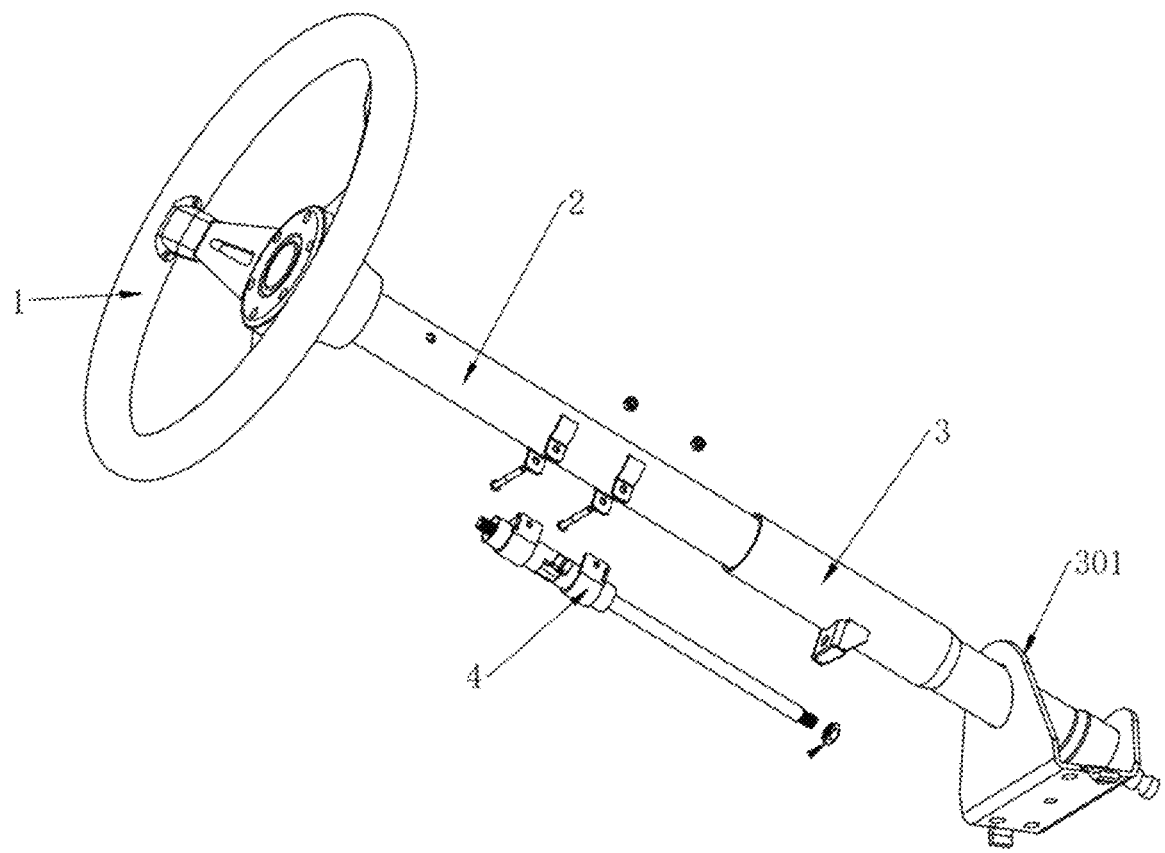
FIG. 4 is a schematic view showing mounting of a lifting rod in the disclosure.

Example: Referring to FIG. 1 to FIG. 4, the disclosure relates to a telescopic multifunctional steering column, including a steering wheel 1. An upper column 2 is fixedly mounted inside the steering wheel 1. An outer surface of the upper column 2 is sleeved with a lower column 3. The upper column 2 and the lower column 3 are connected through a spline shaft and a spline groove.

By connecting the upper column 2 and the lower column 3 through the spline shaft and the spline groove, the stability during the extension and retraction process can be improved. Besides, the connection through the spline shaft and the spline groove has very high fitting accuracy, so that the spline shaft can be accurately inserted into the spline groove during the assembly, thereby realizing accurate positioning and fixation and further reducing shaking and deviation during the extension and contraction process. Moreover, the connection through the spline shaft and the spline groove is convenient for assembly and disassembly, which is more convenient for maintenance. Thereby, worn or damaged components can be easily checked and replaced.

An outer surface of the lower column 3 is sleeved with a fixing bracket 301. By arranging the fixing bracket 302, the steering column can be mounted and fixed.

The outer surface of the lower column 3 is provided with a lifting rod 4. The lifting rod 4 may be a hydraulic telescopic rod. One end of the lifting rod 4 is connected to the lower column 3 through a first nut. The first nut is an M8 nut. The outer surface of the lower column 3 is fixedly provided with a mounting plate, and an outer surface of the mounting plate is provided with a mounting hole having a diameter matched with an outer diameter of an end portion of the lifting rod 4. The end portion of the lifting rod 4 is inserted into the mounting hole, and then the M8 nut is engaged with the end portion of the lifting rod 4, so that one end of the lifting rod 4 can be fixed to the outer surface of the lower column 3.

The other end of the lifting rod 4 is connected to the upper column 2 through bolts and second nuts. The bolts are M4 bolts, and the second nuts are M4 nuts. The outer surface of the upper column 2 is fixedly provided with a plurality of sets of mounting brackets, and an outer surface of the mounting bracket is provided with a slot having a diameter matched with that of the M4 bolt. The outer surface of the lifting rod 4 is provided with fixed blocks, and an outer surface of the fixed block is provided with a slot having a diameter matched with that of the M4 bolt, so that the upper part of the lifting rod 4 can be fixedly mounted to an outer side of the upper column 2 through the cooperation between the M4 bolts and the M4 nuts.

The outer surface of the upper column 2 is provided with a housing assembly 5, and the housing assembly 5 is mounted around the outer side of the upper column 2.

The housing assembly 5 includes a left housing 501 and a right housing 502, and the left housing 501 and the right housing 502 are connected and fixed through a plurality of sets of screws 8.

The housing assembly 5 is mounted to the outer side of the upper column 2 through the screws 8, so that the steering column can be integrated with light control and ignition functions, which improves the utilization of the space inside the vehicle and the operating convenience of the driver.

An outer surface of the left housing 501 is provided with a light control module 6. The light control module 6 mounted on the left housing 501 can be connected to and controlled by other electronic systems of the vehicle, so as to realize the light control function of the vehicle. The light control module 6 is fixed on the left housing 501 through a mounting seat provided with a reserved insertion slot.

A pull bolt 7 is inserted inside the left housing 501. An end portion of the pull bolt 7 is provided with a wire rope 701. The pull bolt 7 is connected to a switch of the lifting rod 4 through the wire rope 701. When the pull bolt 7 is reset, the wire rope 701 will drive the switch of the lifting rod 4 to reset, so that the upper column 2 and the lower column 3 are fixed at the adjusted position, which improves the stability during the driving process, reduces the possibility of unexpected extension and retraction due to accident touch during the driving process, and makes the driving process safer.

An outer surface of the right housing 502 is provided with an ignition module 9.

The ignition module 9 and the light control module 6 are mounted on the housing assembly 5, so that the two critical components can be mounted stably and accurately, and can be connected to and controlled by other electronic systems of the vehicle.

Operating principle of the disclosure: When it is required to make the steering column extend or retract during or before driving, the driver first pulls up the pull bolt 7 and rotates it by a certain angle, so that it remains in the pulled and fixed position. At this time, the upper column 2 and the lower column 3 become adjustable and telescopic, and the driver can adjust the upper column 2 to the required position. After the upper column is adjusted to the proper position, the driver rotates the pull bolt 7 to another angle, so that the pull bolt automatically resets and retracts. The reset action of the pull bolt 7 drives the locking switch of the lifting rod 4 to reset through the wire rope 701, so that the upper column 2 and the lower column 3 are locked at the selected position.

Thereby, the driver can easily adjust the length of the upper column 2 and the lower column 3 by operating the pull bolt 7 without complicated tools or steps. Moreover, by arranging the pull bolt 7, the possibility of unexpected extension and retraction during the driving process can be reduced, thereby improving the driving comfort and safety.

An example of the disclosure has been described in detail above, but the content is merely a preferred example of the disclosure and cannot be considered as limiting the scope of implementation of the disclosure. Any equivalent changes and improvements made according to the scope of the disclosure shall still fall within the scope of the disclosure.

What is claimed is:

1. A telescopic multifunctional steering column, comprising a steering wheel, wherein an upper column is fixedly mounted inside the steering wheel, an outer surface of the upper column is sleeved with a lower column, an outer surface of the lower column is provided with a lifting rod, and the outer surface of the upper column is provided with a housing assembly; and a switch of the lifting rod is connected with a pull bolt through a wire rope, and the wire rope is arranged at an end portion of the pull bolt.

2. The telescopic multifunctional steering column according to claim 1, wherein the housing assembly comprises a left housing and a right housing, and the pull bolt is inserted inside the left housing, an outer surface of the left housing being provided with a light control module, and an outer surface of the right housing being provided with an ignition module.

3. The telescopic multifunctional steering column according to claim 1, wherein the upper column and the lower column are connected through a spline shaft and a spline groove.

4. The telescopic multifunctional steering column according to claim 1, wherein the outer surface of the lower column is sleeved with a fixing bracket.

5. The telescopic multifunctional steering column according to claim 1, wherein the left housing and the right housing are connected and fixed through a plurality of sets of screws.

6. The telescopic multifunctional steering column according to claim 1, wherein one end of the lifting rod is connected to the lower column through a first nut, and the other end of the lifting rod is connected to the upper column through bolts and second nuts.

\* \* \* \* \*